Aug. 29, 1933.　　　R. S. CHITESTER　　　1,925,031
TUBE FOR PNEUMATIC TIRES
Filed April 18, 1933
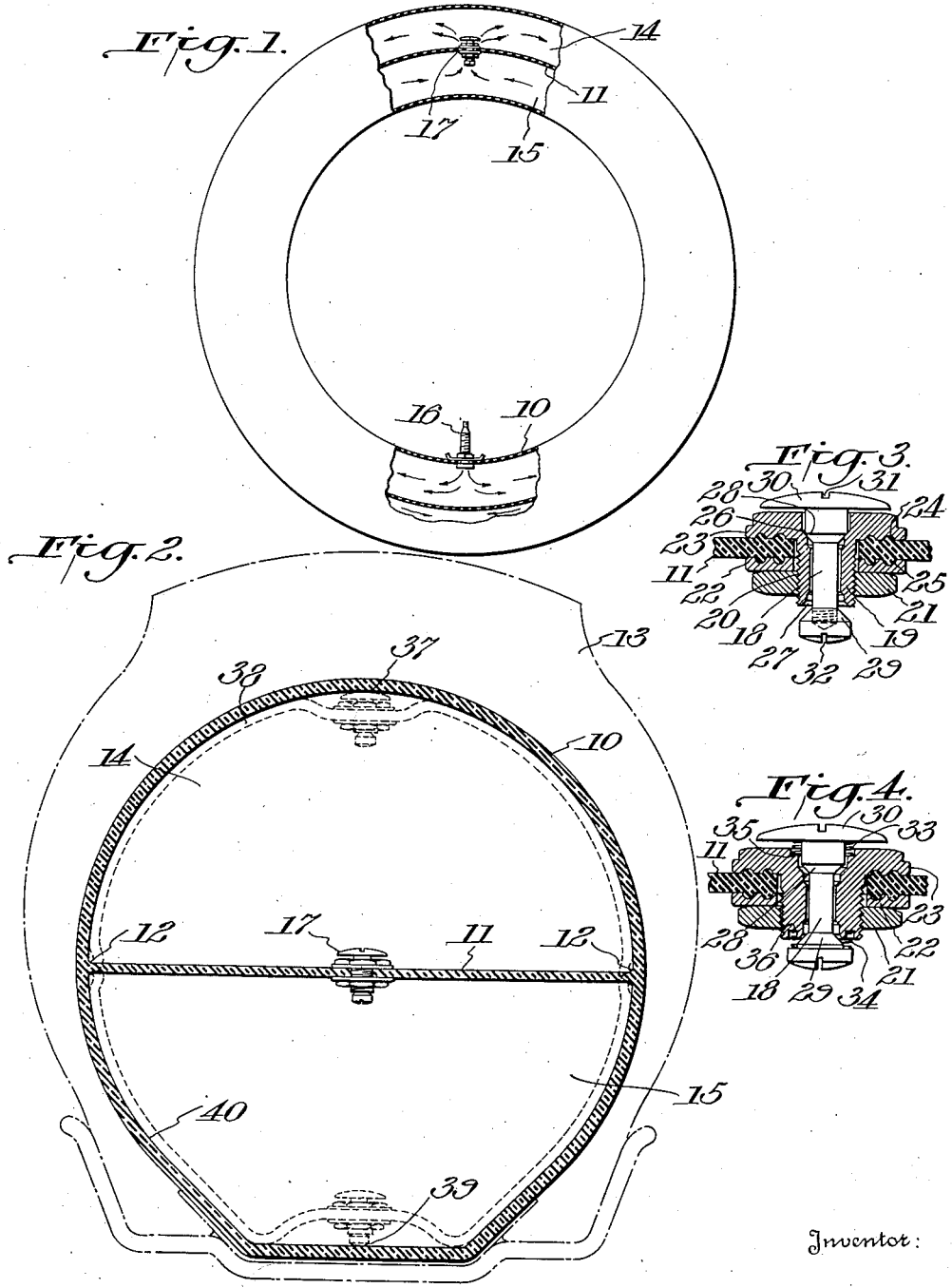
Inventor:
Robert Stanley Chitester,
By Byrnes Townsend & Potter,
Attorneys.

Patented Aug. 29, 1933

1,925,031

UNITED STATES PATENT OFFICE 1,925,031

TUBE FOR PNEUMATIC TIRES

Robert Stanley Chitester, Brookville, Pa.

Application April 18, 1933. Serial No. 666,755

3 Claims. (Cl. 152—22)

This invention relates to tubes for pneumatic tires for vehicles, and more particularly to the type in which the tube is provided with a plurality of air chambers so that if a puncture or leak occurs in one of them the other retains the air, permitting continued use of the tire.

An object of the invention is to provide a tube having a plurality of chambers connected for free passage of the air between them during inflating of the tire, and with means for closing the connection upon occurrence of a puncture, blowout or other cause of air leakage in one of the chambers.

Briefly, my improvement comprises a tube having a transverse web therein dividing the tube into two air chambers, and a valve or valves in said web open to connect the chambers during inflation but closed upon deflation of either one of said chambers to trap the residual air in the other chamber.

The invention will be understood more readily upon referring to the accompanying drawing, wherein, Fig. 1 illustrates, partly in elevation and partly in section, a tube according to one form of the invention, Fig. 2 is a cross-section illustrating in full lines the parts in normal position and in dotted lines the respective positions assumed by the parts upon deflation of one or the other of the chambers, Fig. 3 shows, partly in section and partly in elevation, a suitable valve arrangement, and Fig. 4 is a view similar to Fig. 3 but of a modification in which means are provided to insure proper positioning of the valve in open position when both chambers are inflated or are being inflated.

The tube 10 is provided with a transverse elastic web 11 which may be similar to the tube as to material but preferably somewhat thinner and more flexible. The web is vulcanized or similarly joined along its marginal edges to the inner wall of the tube, as at 12, or it may be molded in one piece with it. The usual casing or shoe of the tire is indicated in Fig. 2 in dot and dash lines at 13.

Preferably the web 11 spans the center of the tube as shown and divides the same into two similar air chambers, an outer one 14 and an inner chamber 15. The usual inflating valve is shown at 16.

In the web 11, preferably at its center with respect to its width and opposite the inflating valve 16, is a two-way valve 17, shown in detail in Figs. 3 and 4, having a stem 18 movable within a sleeve or similar guide 19 clamped to the web 11. As illustrated in the drawing, the sleeve 19 is provided with external threads 20 engaged by a suitable clamping nut 21, a washer 22 being interposed between the web 11 and the nut 21 against which the latter seats. The inner surfaces of the head 23 of the sleeve 19 and of the washer 22 may be provided with suitable ribs or the like 24, 25 to insure proper clamping of the web between them.

An outer seat 26 and an inner seat 27 are provided in the sleeve 19, and are adapted to be engaged, respectively, by a shoulder 28 on the valve and a tapered nut 29 which may be threaded on the inner end of the valve stem 18. The outer head 30 of the valve is preferably relatively flat and of increased area, as shown, and the head 30 and the tapered nut 29 may be provided with suitable slots 31, 32 for reception of a screwdriver, to facilitate assembly.

When inflating the tire (see the arrows in Fig. 1) the valve 17 is open or in neutral position to permit free passage of air from one chamber to the other. This may be accomplished by accurate fitting of the parts, according to the form illustrated in Fig. 3, or if more positive assurance is desired, comparatively weak springs 33, 34 may be interposed, as shown in Fig. 4, between the upper and lower parts, respectively, of the valve and the sleeve 19, spring seats 35, 36 being provided in the sleeve, if necessary or desirable. The springs 33 and 34 maintain the valve normally balanced in open position, that is, with shoulder 28 out of engagement with seat 26 and with the tapered surface of nut 29 out of engagement with seat 27.

Should a puncture or leak occur in the outer portion of the tube 10 so that the chamber 14 becomes deflated, the web 11 will be forced outwardly toward the tread of the shoe, due to the drop in pressure in the chamber 14, until the head 30 of the valve 17 contacts with the inner surface of the tube 10, as indicated at 37 in Fig. 2, whereupon the valve is positively closed, shoulder 28 being forced against the seat 26. The web 11 is flexed in this movement to conform to the inside wall of the tube 10, as indicated in dotted lines at 38 in Fig. 2. The air chamber of the tube is thus now the chamber 15 expanded, and the residual air is sufficient to serve the tire, although underinflated, without injury to the tire and without the dangers incident to punctures, blowouts, etc., until an air-service station is reached. Thereupon the tire may be fully inflated, or if the puncture or other leak in the outer portion of the tube is repaired, the valve 17 is reset in open position. If the modification shown in Fig. 4 is employed it will, of course, reset itself by virtue of the springs 33 and 34.

If a puncture or leak occurs in the inner chamber 15, the web 11 will be forced inwardly toward the rim, due to the drop in pressure in the chamber 15, until the nut 29 of the valve 17 contacts with the inner wall of the tube 10, as indicated at 39 in Fig. 2, whereupon the valve will be positively closed, the tapered surface of the nut 29 being forced against the annular seat 27. The web is flexed in this movement to conform, as soon as sufficient air has escaped from the chamber 15 to permit it, to the inside wall of the tube 10, as indicated in dotted lines at 40 in Fig. 2. The expanded chamber 14 of the tube has thus now become the operating air chamber of the tube, and the residual air therein is sufficient to serve the tire, although underinflated, until repairs can be made, without risk of serious injury to the tire through driving or danger of loss of control of the vehicle. Since the inflating valve connects with the chamber 15 it would be useless to reinflate this chamber until the puncture or leak has been repaired, so that until repairs have been made it will be necessary to operate on just the amount of air remaining in the outer chamber at the time the valve 17 closed. The volume of air in the chamber 14 is slightly more than one-half the total normal volume of air in the tube if the web 11 spans the tube centrally thereof. When the tube is removed from the casing for repair or the like, the valve may be reset by hand in open position, unless the modification shown in Fig. 4 is employed in which case the valve will be restored automatically to open position upon complete release of the air from the chamber 14.

The tendency of the valve 17 to close on the seat 27 by centrifugal force during rotation of the wheel is of advantage in that it reduces or prevents the escape of air from the inner chamber 15 into the outer chamber 14 in case of puncture or other leakage occurring in the outer portion of the tube.

Slight modifications are obvious and are within the scope of my invention. For example, the valve 17 may be given any suitable form, or the details of the same, such as the shape of the head 30 and the nut 29, may be varied, although their surfaces which contact with the inner walls of the tube 10 should be smooth and preferably flat so as not to injure the tube. Also, two or more valves may be employed but it is believed that ordinarily one will prove to be ample.

I claim:

1. A tube for pneumatic tires having a transverse web therein dividing the tube into two air chambers, and a valve in said web open to connect said chambers during initial inflating and adapted to close upon deflation of either chamber, said web being flexible to permit expansion of one of said chambers to substantially the capacity of the tube when the other chamber becomes deflated, and said valve adapted to be held closed upon deflation of either of said chambers and consequent expansion of the web by engagement of the valve with the tube wall of the deflated chamber.

2. A tube for pneumatic tires having a transverse web therein dividing the tube into inner and outer air chambers, and a valve in said web open to connect said chambers during initial inflating, said valve adapted to seat in either of two directions upon deflation of either chamber, and said web capable of distortion to permit expansion of either chamber to substantially the capacity of the tube upon deflation of the other chamber, said valve seating in one direction upon initial distortion of said web to close communication between said chambers, and being seated in the other direction by contact with the tube wall of the deflated chamber when said web reaches the limit of its distortion as determined by said tube wall.

3. A tube for pneumatic tires having a transverse web therein dividing the tube into inner and outer air chambers, and a valve in said web open to connect said chambers during initial inflating, said web being flexible to permit expansion of one of said chambers to substantially the capacity of the tube when the other chamber becomes deflated by puncture, leakage or the like, and said valve capable of seating in either of two directions so as alternatively to close in one direction by its engagement with the tube wall of one of said chambers when same is deflated and to close in the other direction by its engagement with the tube wall of the other of said chambers when said other chamber is deflated.

ROBERT STANLEY CHITESTER.